United States Patent [19]

Clark

[11] 4,070,030
[45] Jan. 24, 1978

[54] COMBINATION SLED AND RAMP

[76] Inventor: Bob J. Clark, 467 E. Anderson, Idaho Falls, Idaho 83401

[21] Appl. No.: 684,997

[22] Filed: May 10, 1976

[51] Int. Cl.² .......................................... B62B 13/16
[52] U.S. Cl. ...................................... 280/24; 214/85
[58] Field of Search .............. 280/24, 656, 20, 491 R, 280/291 B, 408; 296/27, 26; 214/85, 85.1

[56] References Cited

U.S. PATENT DOCUMENTS

| 660,508 | 10/1900 | Harboth | 296/27 |
|---|---|---|---|
| 1,374,175 | 4/1921 | Arato | 280/408 |
| 2,879,072 | 3/1959 | Rear et al. | 296/27 |
| 3,406,982 | 10/1968 | Jorns | 280/24 |
| 3,464,735 | 9/1969 | Smith | 280/24 |
| 3,757,972 | 9/1973 | Martin | 214/85 R |
| 3,820,806 | 6/1974 | Cline et al. | 280/24 |

Primary Examiner—Robert R. Song

Attorney, Agent, or Firm—Warren T. Jessup

[57] ABSTRACT

A device which can be used as a sled towed by a vehicle such as a snowmobile which can be converted to a ramp for loading a snowmobile or any vehicle onto a transporting device such as a truck. The device is comprised of a frame having vertical sides forming a container with a pair of skids attached beneath the frame and a tongue or hitch attached to one end for towing purposes. The sides and ends are attached in a manner which permits them to be adjusted to a position for converting the body of the sled to a loading ramp. A transition piece is attached to the end of the frame for attaching the device to a transporter for loading purposes. The vertical sides are hinged to adjust to various positions and act as guides, if desired. The frame is provided with suitable attachment devices so that the hitch or transition piece may be attached to either end.

9 Claims, 14 Drawing Figures

U.S. Patent   Jan. 24, 1978   Sheet 1 of 3   4,070,030
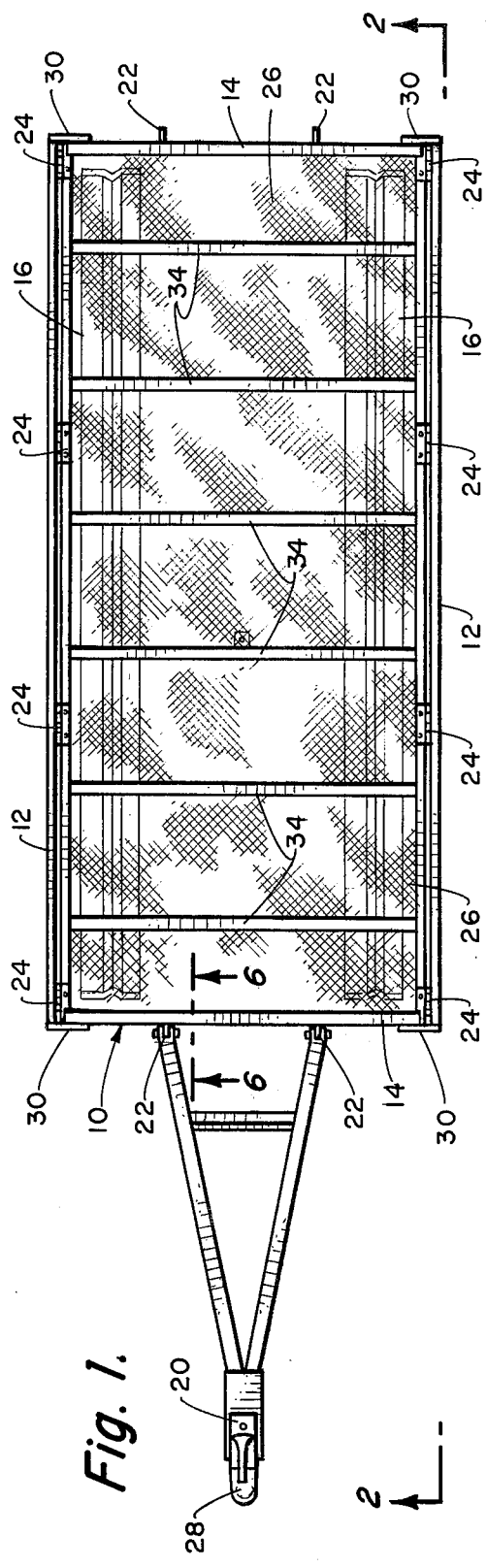
Fig. 1.
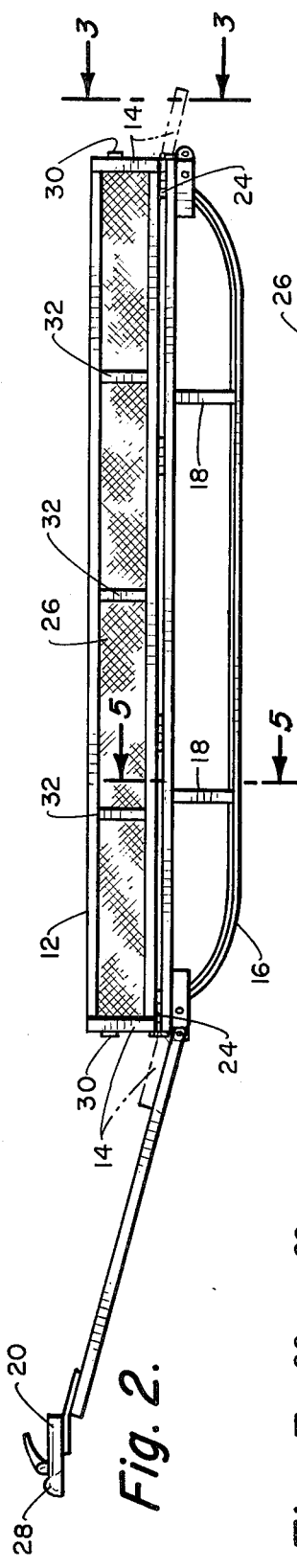
Fig. 2.
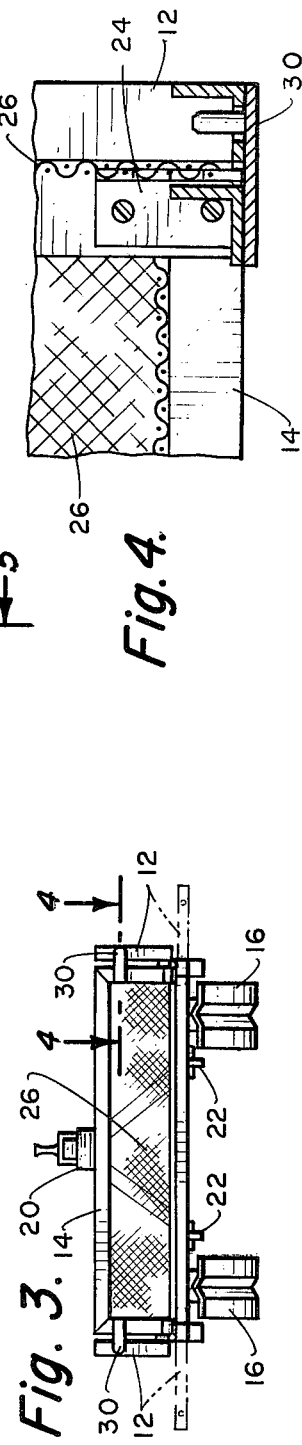
Fig. 3.
Fig. 4.

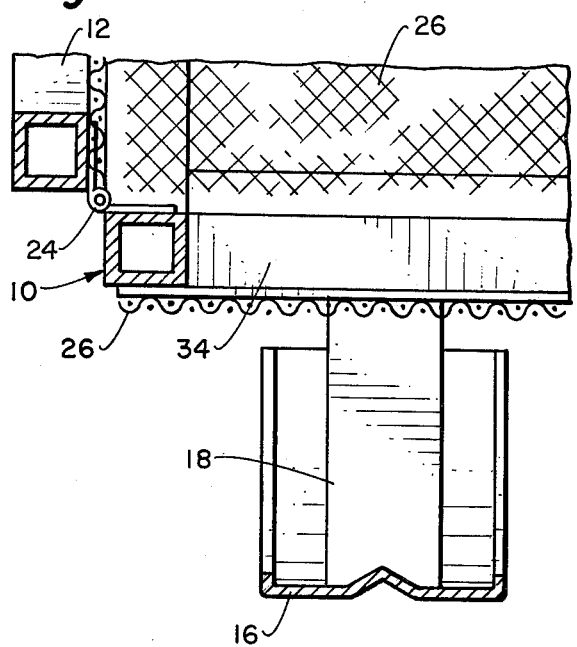
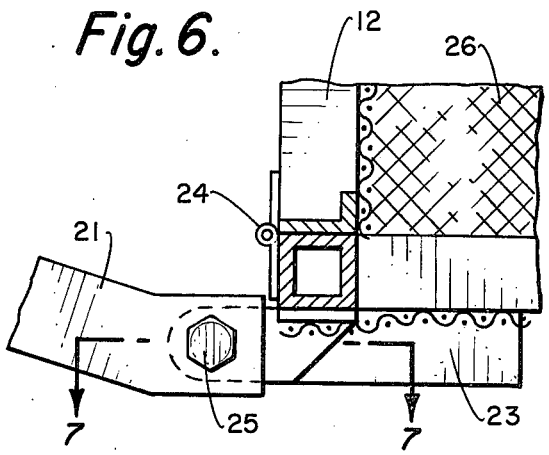
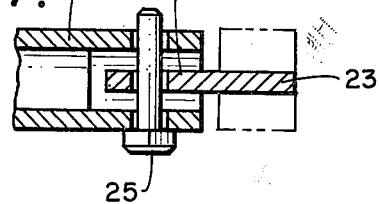
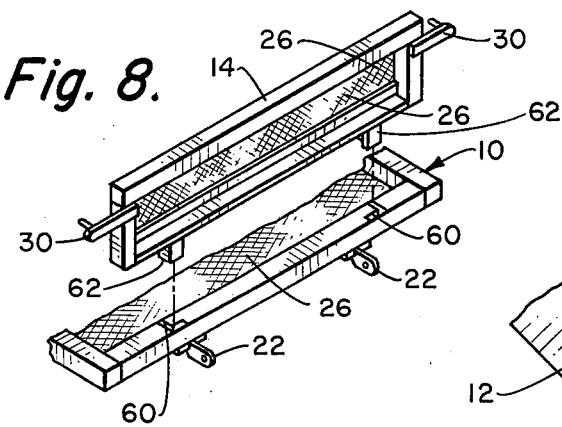
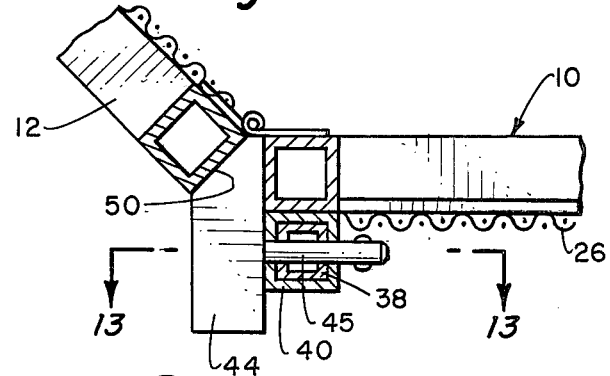
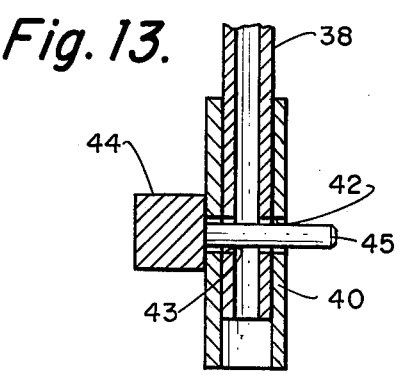
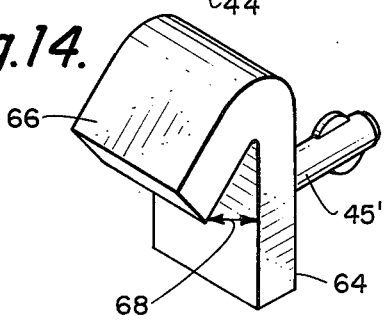

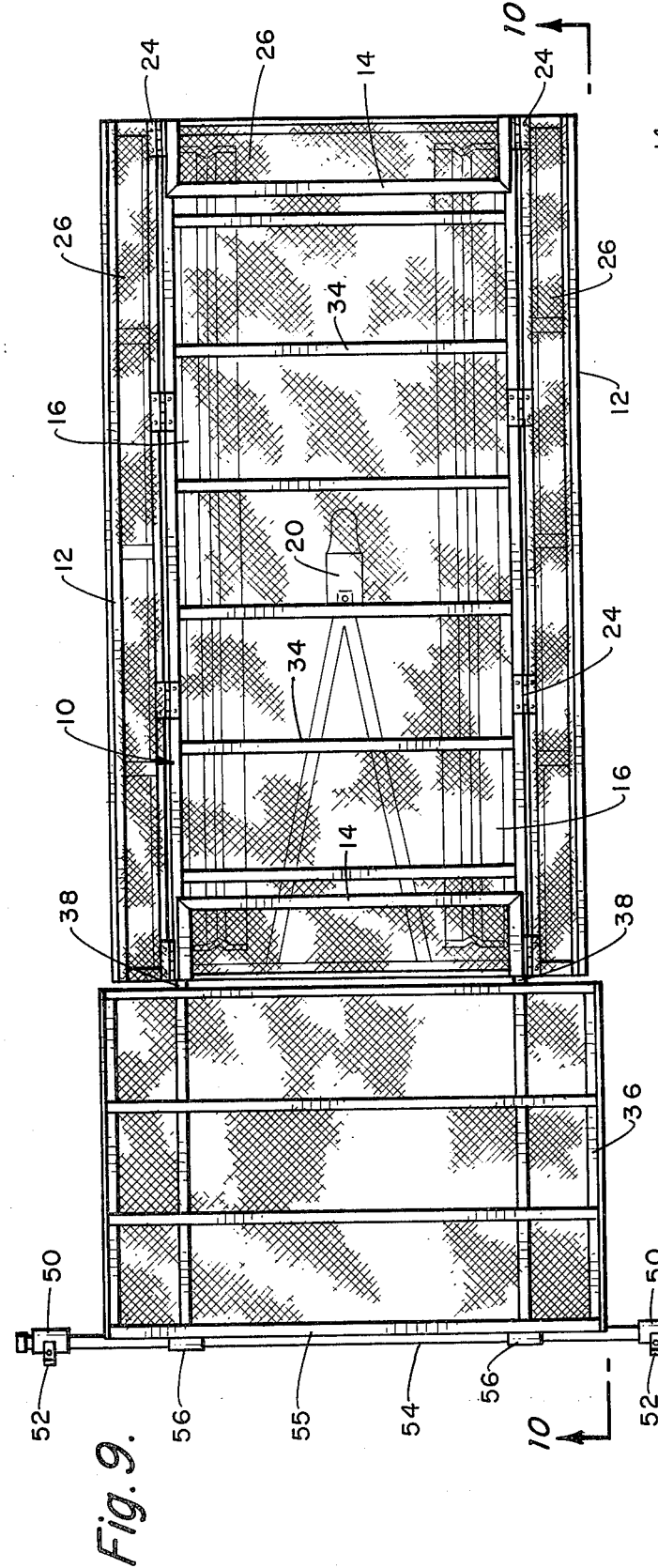
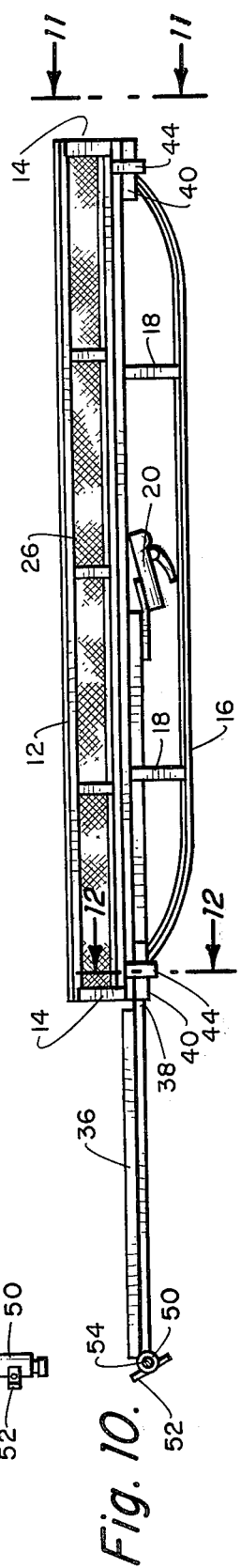
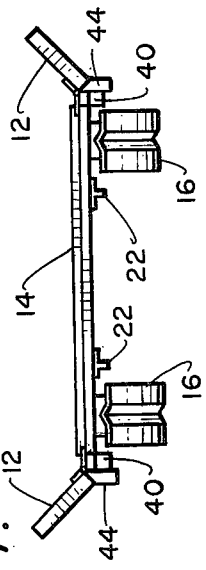
Fig. 9.
Fig. 10.
Fig. 11.

COMBINATION SLED AND RAMP

BACKGROUND OF THE INVENTION

This invention relates to sleds suitable for dual purposes and more particularly relates to a sled which is convertible to a loading ramp.

Transportation devices on snow and ice frequently are not equipped to travel on dry land therefore must be transported to the ice or snow. Because of this necessity of transportation, it is also necessary to provide some means of loading and unloading the device from the transport. Since devices for travel on snow and ice, such as snowmobiles, are usually not very large, they can be transported in small trucks or stationwagons which are not equipped with any type of loading or unloading mechanism. Since is is often the case that a sled for towing by a snowmobile is carried, extra heavy equipment in the form of loading and unloading ramps must be carried also in order to transport and unload the snowmobile from a stationwagon or small truck. This creates a number of obvious disadvantages.

The present invention solves these problems by providing a device which is useful as a sled for towing by a snowmobile but is also convertible to a ramp for loading and unloading the snowmobile. The device can be quickly converted from a ramp to a sled when the destination is reached and converted back to a ramp when reloading the snowmobile onto the transporter.

SUMMARY OF THE INVENTION

The purpose of the invention is to provide a sled for towing by a snowmobile which is convertible to a ramp for loading and unloading the snowmobile on a transporter, thus eliminating the need for carrying additional heavy equipment.

The present invention is comprised of a frame with vertical sides which form a container having skids underneath so that the device can be towed like a sled. Each end of the device has fixtures for attaching a hitch or tongue in order that the device may be towed by a snowmobile. To convert the device to a ramp, the sides and ends are eliminated by folding them flat or removing them and a transition or extension added to provide connection of the ramp to a stationwagon or truck tail gate. The extender has bars fitting into receptacles on the underside of the frame which are locked in place by pins. The hitch is hinged so that it can be folded beneath the frame between skiis or skids and locked beneath the sled when the device is being used as a ramp.

The sled is converted to a ramp by folding the sides flat and adding the extender by inserting locking bars in the receptacles on the underside ends of the frame and securing them with locking pins. The outboard ends of the pins are provided with chamfered surfaces or angled ends which when turned in a vertical position will support the sides at an angle, thus allowing them to be used as guides. The ramp is then attached to the tail gate of a truck or stationwagon by passing a bar through interlocking receptacles on the extender and the tail gate.

Other objects, advantages and novel features of the invention become apparent from the following detailed description of the invention, when considered in conjunction with the accompanying drawings wherein like reference numbers identify like parts throughout the drawings.

BRIEF DESCRIPTION OF THE DRAWINGS

FIG. 1 is a top elevation of the device with the ends and sides in a vertical position for use as a sled.

FIG. 2 is a side elevation of the sled configuration of the device of FIG. 1.

FIG. 3 is an end view of the sled of FIG. 1.

FIG. 4 is a sectional view taken at 4—4 of FIG. 3.

FIG. 5 is a partial section taken at 5—5 of FIG. 2.

FIG. 6 is a view taken at 6—6 of FIG. 1.

FIG. 7 is a section taken at 7—7 of FIG. 6.

FIG. 8 illustrates an alternate method of attaching the ends.

FIG. 9 illustrates the device converted for use as a ramp.

FIG. 10 is a side elevation taken at 10—10 of FIG. 9.

FIG. 11 is an end view taken at 11—11 of FIG. 10.

FIG. 12 is a sectional view taken at 12—12 of FIG. 10.

FIG. 13 is a sectional view taken at 13—13 of FIG. 12.

FIG. 14 illustrates an alternate method of constructing a ramp extension locking pin.

DETAILED DESCRIPTION OF THE PREFERRED EMBODIMENT

The sled configuration of the device is shown in FIGS. 1–3 and is comprised of a frame 10 having adjustable sides 12 and ends 14. Skids 16 are attached to the bottom of the frame 10 by brackets 18 and are symmetrically shaped so that the sled can be towed in either direction. For towing purposes a hitch 20 is pivotally attached to the end of the frame by means of sockets 22. Sockets 22 are provided on both ends of frame 10 so that the hitch 20 can be detached and reattached to the opposite end to tow the sled in either direction. The purpose of this is to permit the sled to easily be used with a snowmobile which generally does not have a reverse gear.

The sides 12 are attached to the frame 10 by a plurality of hinges 24 which permit the sides to be folded flat. This permits the sled to be used as a flat vehicle in addition to being used as a ramp. Ends 14 may also be hinged to fold flat. The frame 10, sides 12, and ends 14 are covered with a suitable screening material 26.

The hitch 20 is provided with the usual socket 28 for connecting to the ball of a hitch on a vehicle. When the sides 12 and ends 14 are in the vertical position they are maintained in place by suitable brackets 30 joining the corners. These may be of any suitable design and may be locks or latches or merely a plate having pins inserted in holes in the sides and ends as shown. Additional strengthening bars 32 on the sides and cross bars 34 on the frame provide greater rigidity for the sled.

The conversion of the sled of FIGS. 1–3 to a loading ramp is shown in FIGS. 9 through 11. When used as a loading ramp the sled has an extender or transition piece 36 temporarily attached to the frame 10 in order to connect the device to the tail gate of a stationwagon or truck (not shown). The extension 36 is attached by rods 38 which engage hollow interlocking sockets 40 attached to the bottom side corners of the frame 10. A hole 42 (FIG. 13) in the interlocking sockets 40 matches with a similar hole 43 in the arms 38 permitting the extender 36 to be locked to the frame 10 by means of a pin 45 attached to pillow block 44. When used for a loading ramp, the end members 14 may be folded flat inboard of the frame 10 of removed as will be described with respect to FIG. 8.

Also, the hitch 20 folds beneath the frame 10 and is secured by a suitable catch (not shown) beneath the frame. When the sled is converted to a ramp, the sides 12 can be used as guides by keeping them at a slight angle to the horizontal surface of the frame 10 and preferably at an angle at approximately 45°. For this purpose each pillow block 44 is provided with a chamfered surface 50 which holds the sides 12 at an angle to the horizontal. The frame 10 would have sockets 40 on all four corners with pillow blocks 44 installed in each as shown to hold the sides at a predetermined angle. For folding the sides 12 flat, the pillow blocks 44 can be rotated to a position parallel with the surface of the frame 10.

The ramp is attached to the tail gate of a pick-up truck or other vehicle by means of sockets 50 bolted to the tail gate by ears 52. The forward end 55 of extender 36 is then secured by a rod 54 passed through hollow cylindrical couplings 56 securely attached to front end 55 of the extender frame 36. When attached in this manner the device permits a snowmobile to be driven on or off the bed of a transport device, such as a truck or stationwagon, and the ramp or sled to then be removed and loaded for transporting to an area for use. After unloading the snowmobile, the frame 10 may be disconnected from the extender 36 and then quickly converted to use as a sled by folding hitch 20 outboard and raising or attaching sides 12 and ends 14. The extender 36 may be left attached to the tail gate and folded into an upright position or may be removed and stored. When reloading the snowmobile the sled and ramp can also be loaded and provide a low profile by folding the ends 14 and sides 12 inboard, if desired. Preferably the entire frame, side and an extender 36 is made from hollow aluminum bar stock in order to be light in weight. Obviously, many other materials, such as wood, steel or any other suitable material can be used.

One method of attaching the tongue 20 is illustrated in FIGS. 6 and 7. The bar 23 attached to the frame 10 provides a socket for attaching each arm 21 of the tongue 20. Each arm engages the socket end 22 of the bar 23 and is fastened by a pin 25 or bolt. This method permits easy detachment for complete removal and reattachment to the sockets 22 on the opposite end of the sled-ramp frame 10.

In FIG. 44 an alternate method of constructing the pillow block 44 is shown. The heavy block is replaced with a bent plate 64 having a tab 66 bent at an angle 68 which is preferably 45°, but may be more or less if desired.

There are obviously a number of variations or alternatives for contructing the sled other than those shown. For example, the ends 14 could be made detachable detachable as shown in FIG. 8 by providing vertical sockets 60 on each end of the frame or right in the frame which would permit the ends to be completely detached by engaging prongs 62. Additional sockets (not shown) could be provided in the cross members 34 of the frame 10 which would permit the ends to be positioned in any manner to partition the sled, if desired.

Obviously, many modifications and variations are possible in the present invention in light of the teachings. It is therefore to be understood that the full scope of the invention is not limited to the details disclosed herein and may be practiced otherwise than as specifically described.

What is claimed is:

1. A dual-purpose sled comprising:
    a frame forming a bed;
    skid means attached to the underside of said frame;
    towing means attached to an end of said frame;
    changeable sides and ends on said frame;
    said changeable sides including adjustable means for adjusting them flat with said frame;
    said changeable ends including means for displacing said ends to a non-obstructing position whereby said frame may be used as a ramp; and
    convertible means for converting said frame into a loading ramp.

2. The sled according to claim 1 wherein the means for displacing said ends comprises means for folding the ends flat with the frame.

3. The sled according to claim 1 wherein the means for displacing said ends comprises means detachably securing said ends to said frame.

4. The sled according to claim 1 wherein said means for converting the sled to a loading ramp comprises:
    a detachable extension attachable to either end of said frame;
    said extension having means for securing said ramp to a transport vehicle.

5. The sled according to claim 4 wherein said extension includes interlocking means for attaching said ramp to a transport vehicle.

6. The sled according to claim 1 wherein said frame is symmetrical and includes means for attaching the towing means or convertible means to either end.

7. The sled according to claim 6 wherein said towing means comprises a tongue; and
    said tongue is adapted to fold beneath said frame when not in use.

8. The sled according to claim 1 wherein said adjustable means for said sides comprises:
    hinge means hinging said sides to said frame;
    said hinge means foldably secure said sides to frame wherein said sides may be folded flat with said frame.

9. The sled according to claim 8 including means for supporting the foldable sides at a slight angle whereby they act as guides when using the sled as a loading ramp.

* * * * *